United States Patent [19]

Sauter

[11] Patent Number: 5,535,475
[45] Date of Patent: Jul. 16, 1996

[54] CAR WASH HINGED AIR NOZZLE ASSEMBLY

[76] Inventor: Jerry R. Sauter, 1905 Birdseye Creek Rd., Gold Hill, Oreg. 97525

[21] Appl. No.: 195,306

[22] Filed: Feb. 11, 1994

[51] Int. Cl.$^6$ ....................................................... B60S 3/04
[52] U.S. Cl. ........................... 15/316.1; 15/405; 15/415.1; 34/666
[58] Field of Search .................................. 15/316.1, 405, 15/312.1, 415.1; 34/243 C

[56] References Cited

U.S. PATENT DOCUMENTS

| | | | |
|---|---|---|---|
| 2,949,678 | 8/1960 | Anderson | 15/405 X |
| 3,263,341 | 8/1966 | Allen | 15/405 X |
| 3,442,027 | 5/1969 | Hurwitz | 15/405 X |
| 3,808,703 | 5/1974 | Kamiya . | |
| 3,877,107 | 4/1975 | Cirino . | |
| 3,903,562 | 9/1975 | Miles | 15/312.1 X |
| 3,994,041 | 11/1976 | Barber . | |
| 4,161,801 | 7/1979 | Day et al. . | |
| 4,409,035 | 10/1983 | McElroy et al. . | |
| 4,433,450 | 2/1984 | McElroy et al. . | |
| 4,445,251 | 5/1984 | McElroy . | |
| 4,589,160 | 5/1986 | Day et al. . | |
| 4,700,426 | 10/1987 | McElroy . | |
| 5,189,754 | 3/1993 | Sauter | 15/405 X |

Primary Examiner—Chris K. Moore
Attorney, Agent, or Firm—Edward B. Anderson

[57] ABSTRACT

An air distribution system of a car wash air blower system is provided for directing air to a vehicle travelling along a predefined path using an air producer mounted on each side of the path for producing flowing air. Nozzle assemblies are attached to the distribution system at the ends of the predefined routes for directing air toward a vehicle travelling along the vehicle path. A pivoting hinge hinges a nozzle relative to a distribution duct. A first hinge section is pivotally secured to the second hinge section in a manner allowing rotation of the second hinge section about a defined axis of air travel. The two hinge sections are secured by a frame mounted in the air flow path to the hinge sections. A nozzle directs a stream of air toward the surface of a vehicle positioned adjacent to the nozzle. One nozzle embodiment includes a curved air distribution cell formed of a flexible webbing and having a generally triangular shape. An alternative embodiment is a nozzle having a cylindrical shape. Linear rows of nozzle openings are protected by ridges formed in a guard extending along the rows of openings.

8 Claims, 5 Drawing Sheets

CAR WASH HINGED AIR NOZZLE ASSEMBLY

BACKGROUND OF THE INVENTION

1. Field of the Invention

This invention relates to air blower systems for vehicles, such as in a car wash, and particularly to such systems having hinged nozzle assemblies.

2. Related Art

Historically, automatic car washes have included an air blower system for blowing water off of vehicles after being washed, in order to avoid leaving water marks on the vehicle surface. The original air blowers were positioned away from the travel path of a car moving through a car wash, so that there would be no contact between the air blower nozzles and the vehicle. This required using very large (such as 100 to 150 HP) and extremely noisy blower motors.

In order to reduce the size of the blower motors, air distribution systems were developed that included nozzles positioned close to, and sometimes in contact with the vehicle surface. An example of such as system is the model having the proprietary name of "The Stripper" manufactured by Proto-Vest, Inc. of Oxford, Mich. This blower system is also covered by various U.S. patents, including U.S. Pat. Nos. 4,409,035 for a "Clamp for Varying the Hinging Action of a Fluid Stripping Bag", 4,446,592 for a "Nozzle Assembly", and 4,589,160 for "Apparatus for Stripping Fluids Including Dimensionally Stable and Substantially Rigid Bag".

This proprietary blower system uses a smaller blower motor since it uses fibrous bags that are substantially rigid when inflated. The commercial version of the bag does not hinge to accommodate differences in vehicle surfaces. Since the nozzles are made of a rigid plastic, a row of rollers are used that extend along a lip of the nozzle for contacting the vehicle surface, and therefore reduce the amount of scraping of the surface. Such nozzles, however, tend to be relatively heavy and expensive to manufacture.

There thus remains a need for a hinged nozzle assembly that accommodates locating the nozzles close to a vehicle surface without marring the surface and moves readily to conform to the vehicle surface as the vehicle moves past the nozzles.

SUMMARY OF THE INVENTION

These features are provided in the present invention by a hinged nozzle assembly.

In one aspect of the invention, a pivoting hinge usable for hinging a first section of a duct relative to a second section of a duct is provided. A first hinge section is attachable to the first section of the duct for transmitting air flowing between the first and second sections of the duct along a defined axis of air travel. A second hinge section is attachable to the second section of the duct for further transmitting air flowing between the first and second sections of the duct. The first hinge section is pivotally secured to the second hinge section in a manner allowing rotation of the second hinge section about the defined axis of air travel. The two hinge sections are preferably secured by a frame mounted in the air flow path to the hinge sections. The mounting to at least one of the hinge sections provides pivoting between the hinge section and the frame.

In a further aspect of the invention, a nozzle is connectable to a pressurized air source for directing a stream of air toward the surface of a vehicle positioned adjacent to the nozzle. The nozzle has an air inlet portion connectable to the pressurized air source for transmitting air from the air source into the nozzle. An outlet portion has a plurality of openings distributed linearly. There are preferably two rows of alternating openings to produce a generally uniform air stream. A plenum portion couples the inlet portion to the outlet portion for transmitting air along a travel path between the inlet portion and outlet portion. The plenum portion is formed of a preferably waterproof, rigid webbing and extends in an arc between the inlet and outlet portions. In an alternative embodiment, the plenum portion has a cylindrical shape, with the outlet portion extending longitudinally along the plenum portion.

It will be seen that a hinged nozzle apparatus having the features of the present invention allows relatively free hinging of the nozzles, thereby permitting contact between the nozzle and vehicle surface with minimal marring, and uses a curved or cylindrival nozzle formed of resilient material to reduce abrasion while providing near-contact with the vehicle surface.

These and other features and advantages of the present invention will be apparent from the following detailed description of the preferred embodiment and associated drawings.

DETAILED DESCRIPTION OF THE PREFERRED EMBODIMENT

Figure 1:
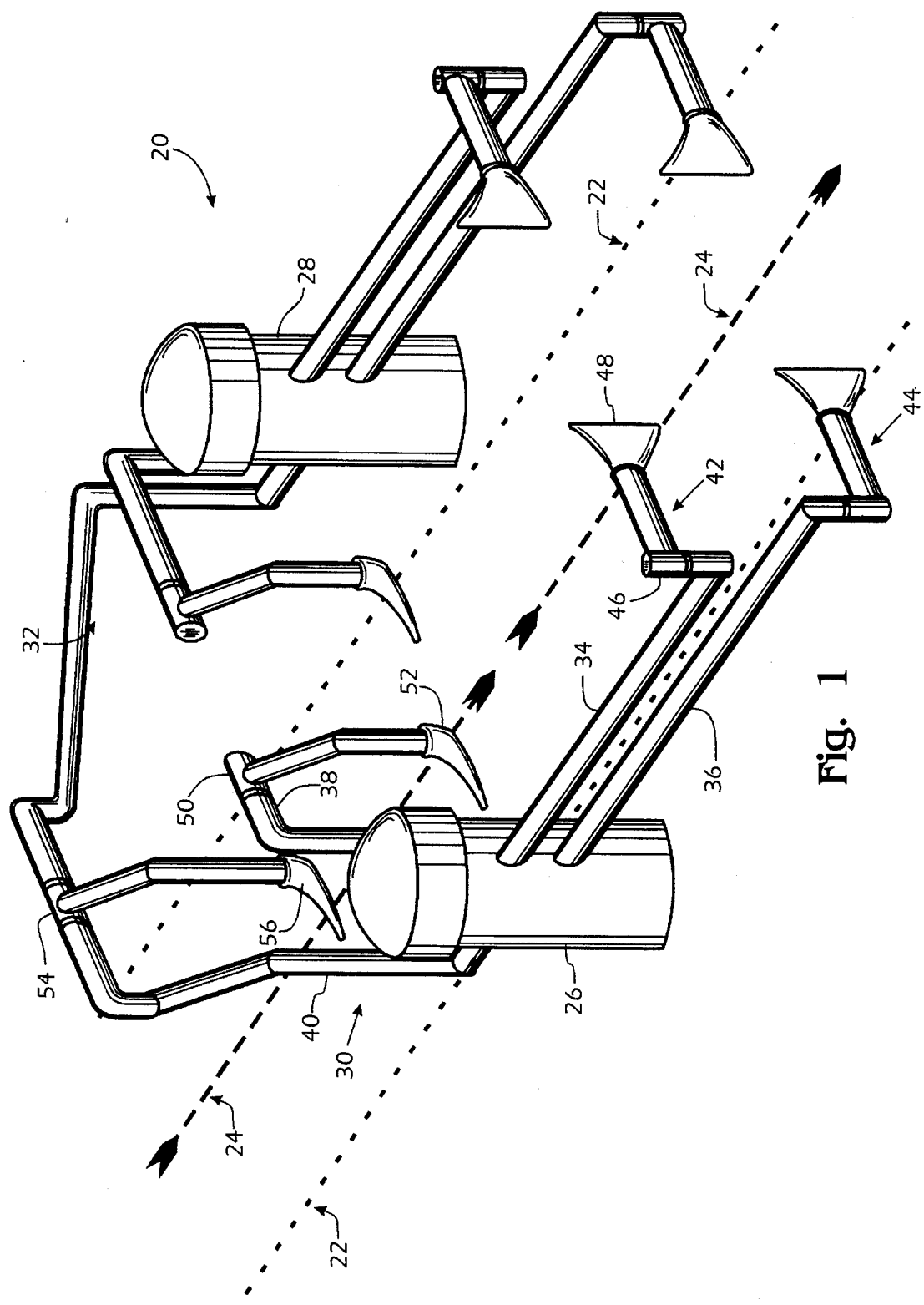
FIG. 1 is a perspective sketch, not to scale, of an air blower system including hinged nozzle assemblies made according to the invention.

Referring initially to FIG. 1, an air blower system 20 embodying the invention is shown in relationship to a vehicle track, shown generally at 22 and having a path center 24, of a vehicle washing system, not otherwise shown.

System 20 includes air producers or blowers 26 and 28, one being positioned on each side of the vehicle track. The structure of these producers are described in U.S. Pat. No. 5,189,754 issued Mar. 2, 1993. Each air producer generates a volume of air that is distributed through a right distribution system 30 and a left distribution system 32. The designation of right and left as used herein is from the perspective of an individual travelling in a vehicle along track 12 from the upper left of the figure to the lower right.

Distribution systems 30 and 32 are symmetrical about a plane passing vertically through path center 24. Only distribution system 30 will be described. The description is equally applicable to system 32.

Distribution system 30 includes four duct lines 34, 36, 38 and 40, and are connected to air producer 26. The support structure and actual dimensions and shape of the duct lines are not shown, as: these are readily apparent to one skilled in the relevant art.

Lines 34 and 36 extend forward of the air producer and are spaced vertically, as illustrated, for blowing water from: the side surfaces of a vehicle passing through system 20. The duct lines terminate at hinged nozzle assemblies 42 and 44. Each nozzle assembly includes a hinge and nozzle, such as hinge 46 and nozzle 48 in nozzle assembly 34. As will be discussed in further detail with reference to FIGS. 2–4, the hinges allow the nozzles to rotate freely about an axis passing through each hinge. They are preferably held in position by a small pressurized oil-filled cylinder (not shown) attached across the hinges, as is conventionally known in the industry. As a vehicle passes through and contacts these nozzles, the vehicle pushes them forward and they pivot away from the path center, following the side of the vehicle as it passes.

As shown, intermediate distribution line 38 is supported above the vehicle, with a duct hinge 50 having a generally horizontal pivot axis. A nozzle 52 is suspended from hinge 50 and spaced to the side of a vertical plane passing through path center 24. These intermediate nozzles blow fluid from the outer edges of the top or upward-facing surfaces of a vehicle.

The three distribution lines 34, 36 and 38 have lengths that are about the same. Rear distribution line 40 extends behind the intermediate line for initially contacting an upward-facing vehicle surface. This line is significantly longer than the other distribution lines, and is therefore coupled to the rear distribution lines associated with both left and right distribution systems. These combined distribution lines are coupled to a single rear duct hinge 54 having a horizontal pivot axis. A nozzle 56 is suspended downwardly for swinging in the vertical plane containing path center 24.

These downward hinging nozzle assemblies are also preferably controllably lifted by small lightweight air cylinders (not shown) and are lowered in a regulated fashion by an air spring or other suitable device (also not shown). These allow the nozzle assemblies to be lifted out of the way when desired, such as when a vehicle has a luggage rack that could damage a nozzle, or when it is desired to keep the nozzles out of a dirty pick-up bed.

The air producers each have an air outlet plenum that is in communication with each of the four associated distribution lines. Thus each line is fed air at substantially equal pressure. When the air resistance in each line is equal, each line receives the same volume of air flow. This is approximately the situation with distribution lines 34, 36 and 38. When line 40 is about twice as long as the other lines, and is fed from both air producers, as shown, nozzle 56 receives about the same air flow as the other nozzle assemblies. Thus, the nozzle assemblies output about the same volume of air and are therefore, when using identical nozzle% assemblies, about equal in effectiveness in removing water from a vehicle surface.

Figure 2:
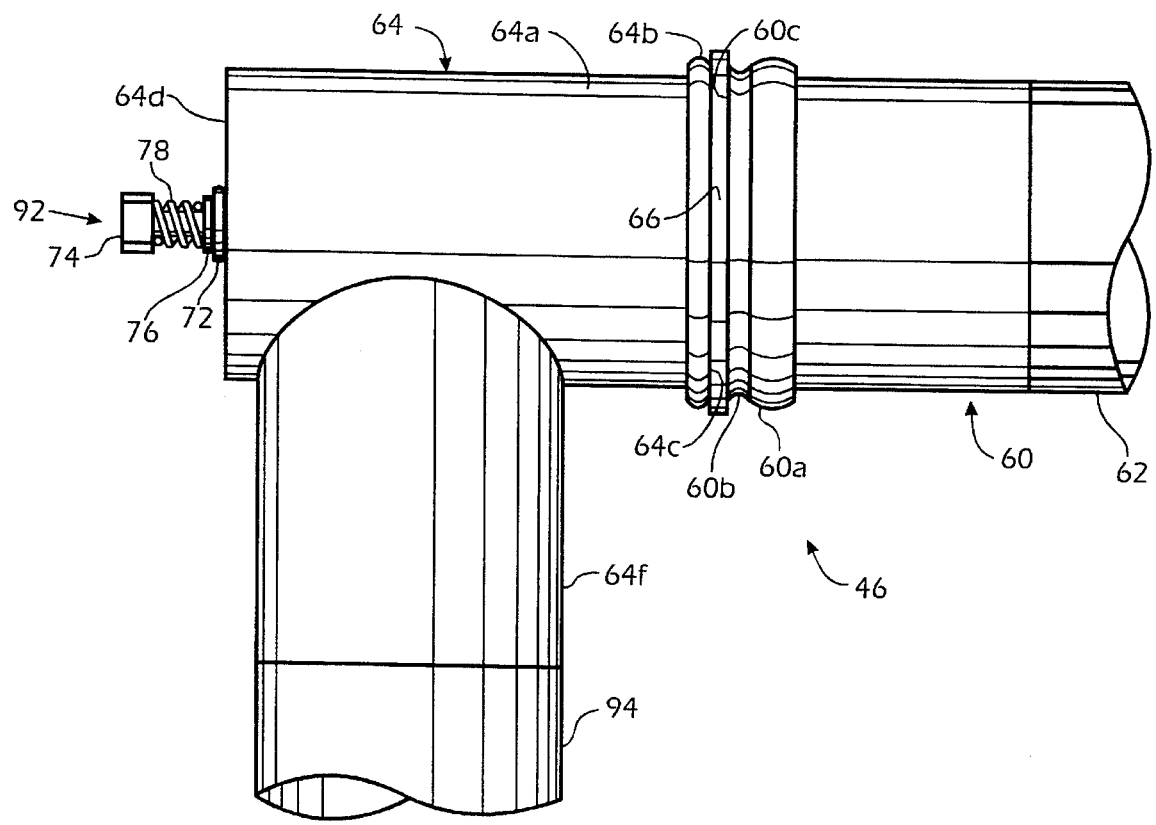
FIG. 2 is a side view of a duct hinge used in the hinged nozzle assemblies of FIG. 1.
Figure 3:
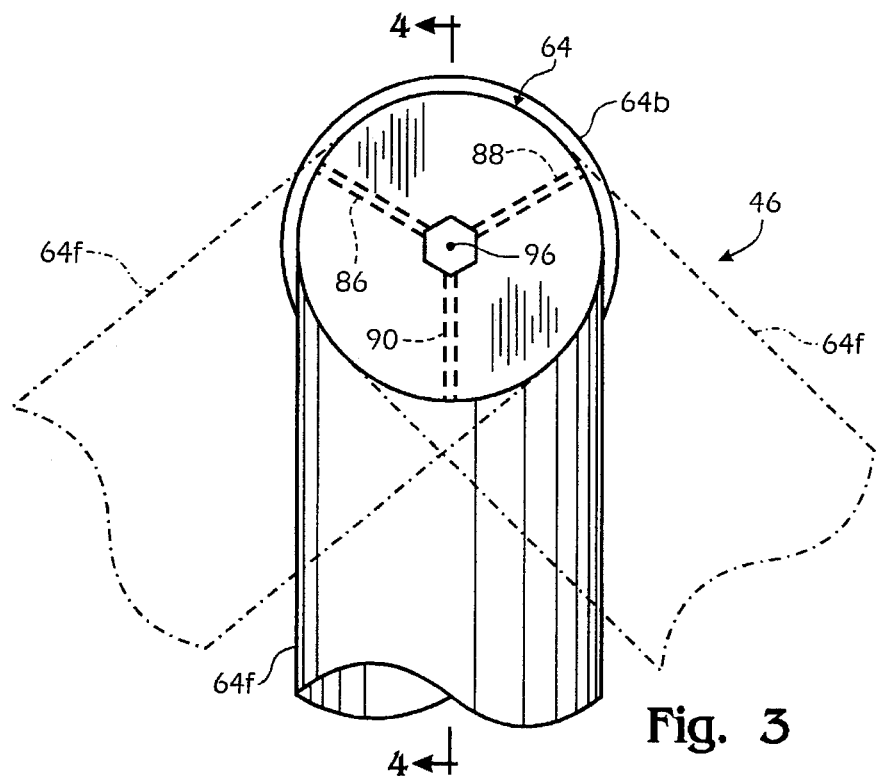
FIG. 3 is an end view of the duct hinge of FIG. 2 as viewed from the left in that figure.
Figures 4, 5, 6:
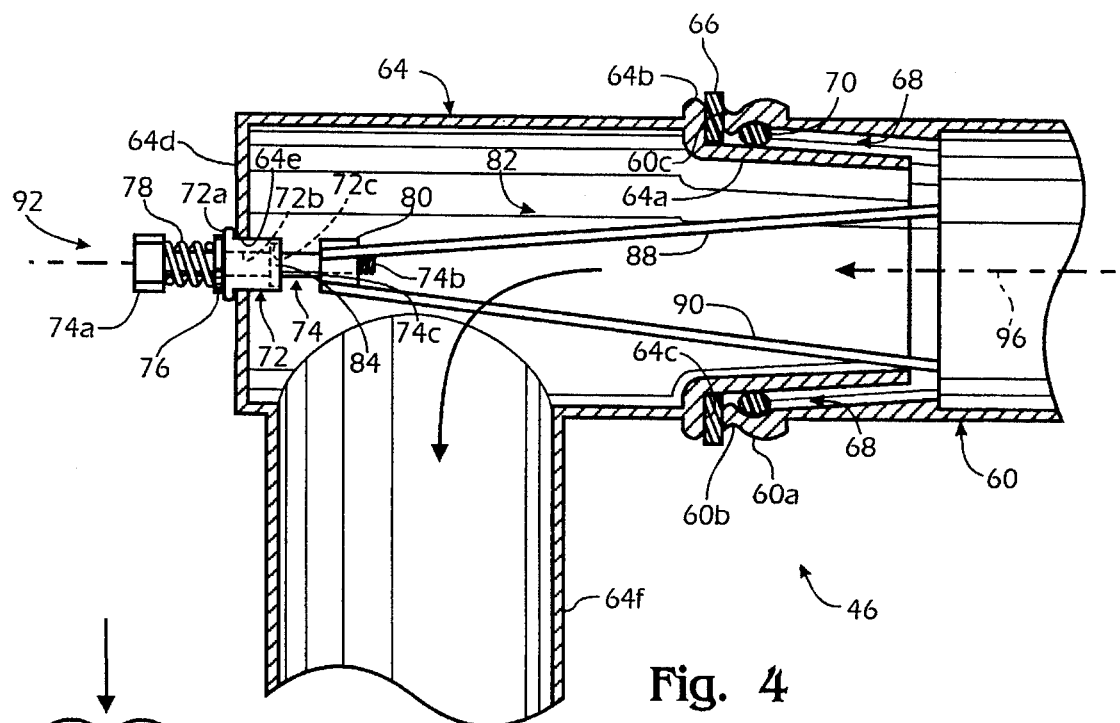
FIG. 4 is a cross section taken along line 4—4 of FIG. 3.
FIG. 5 is a side view of a nozzle used in the hinged nozzle assemblies of FIG. 1 showing the configuration of outlet openings.
FIG. 6 is a view of the nozzle of FIG. 5 as viewed from the left in that figure.

FIGS. 2–4 illustrate the structure of duct hinges 46 and 50. These hinges have a 90° bend that is used to change the direction of air flow. They could also be built to provide for air flow straight through, or at any transverse angle. Additionally, although they are described for air flow as used in system 20, the air flow could be in either direction, depending on the hinging action desired.

Hinge 46 includes a base collar 60 formed in the end of an inlet duct section 62 of distribution line 34. Collar 60 tapers outwardly away from the attached duct section to a circumferential ridge 60a followed by a circumferential valley or groove 60b, to terminate at a radially extending swivel face 60c. The ridge and valley give the collar strength. Face 600 provides a contact surface allowing pivoting.

A duct pivot member 64 has a swivel end 64a that is received within collar 60 and has a circumferential ridge 64b with a corresponding swivel face 64c facing collar swivel face 60c. Swivel end 64a tapers inwardly into collar 60 from ridge 64b and is slightly spaced from the collar. Positioned between the swivel faces of the collar and pivot member is a resilient, bearing ring 66 extending around the circumference of swivel end 64a.

Positioned within the circumferential cavity 68 formed by ridge 60a and swivel end 64a is an industrial grade expandable rubber gasket 70. This gasket functions as a lateral swivel bearing and prevents air from escaping through the swivel joint.

Opposite from swivel end 64a is a pivot mounting plate 64d that, in this embodiment, forms a closed end to pivot member 64. If the hinge provided air flow straight through it, the plate would have suitable openings. Located centrally in this mounting plate is an aperture 64e sized to receive, by press fit, a plastic or nylon bearing 72. Bearing 72 has an enlarged flange end 72a, a central bore 72b, and an enlarged opening 72c. Bore 72b is sized to slidingly receive a mounting bolt 74. Bolt 74 has an enlarged head 74a. A nylon or teflon flat washer 76 with a corresponding aperture (not shown), that also freely receives bolt 74, is positioned on the outside of bearing end 72a. Head 74a and washer 76 serve as retaining rings for a compression spring 78 that is captured between them on the shaft of bolt 74.

A reduced-diameter threaded end 74b of the shaft of bolt 74 is received in a matingly threaded bore of a nut 80 of a support frame shown generally at 82. The shoulder 74c of bolt 74 formed at the transition to the reduced diameter end 74b seats against nut 80 to lock them in place. An air seal 84 sized to receive bolt 74 and fit within bearing opening 72c, seals the bolt in the bearing to prevent the escape of air.

Nut 80 is supported in duct pivot member 64 by three rigid rods or arms 86, 88 and 90. These arms are fixedly attached to nut 80 and collar 60, such as by welding. The use of arms 86, 88 and 90 allows substantially unrestricted air flow through member 64. Bolt 74 and support frame 82 together function as a means or assembly 92 for pivotally securing collar 60 and member 64 together.

The pivot member also includes an outlet section 64f extending at a right angle from the swivel end 64a. The outlet section is connected, in use, to an outlet duct section 94, shown in phantom lines in FIG. 2. Outlet duct section 34 is allowed, by hinge 46, to rotate about an axis of rotation 96 defined by rotation of pivot member 64 relative to collar 60. In the general sense, unless external restrictions are applied to the pivot member, it can rotate completely around collar 60.

FIGS. 5–9 illustrate the structure of a nozzle 100 for use as nozzles 48, 52 and 56. Nozzle 100 includes an air distributor cell 102 formed of a lightweight material, and preferably is flexible when not in use. As viewed from the side, as shown in FIG. 5, the air distributor cell has a generally triangle shape, tapering outwardly from a cylindrical inlet 102a conforming to the shape of a duct tube 104 forming the end of an associated air distribution line shown in FIG. 1. Cell 102 is held in place on tube 104 by a suitable securing means, such as a clamping band 106.

The air distributor cell tapers outwardly from the inlet to a linear array 108 of air jets or openings 110 that are about ½ inch (1.2 cm) in diameter and extend generally transverse to the incoming direction of air flow. Array 108 includes a first set 112 of openings, and a second set 114 of openings that are offset transverse to the direction of airflow out of the openings. This provides for a uniform line of air moving from the array of openings toward a car surface 116 represented generally by the dashed lines in FIGS. 8 and 9. Although these openings are preferably in rectilinear rows, they may also be in the form of curves or other lines, depending on the general car surface with which they will generally be used. Nozzles on different parts of the system may have more or fewer sets of openings in the same or different configurations, and the openings may be of different sizes.

In the embodiment of FIGS. 5–9, a plastic guard 118 is mounted on the face of the nozzle with openings 120 conforming to and in alignment with openings 110. Guard 118 may be made of a commonly available extruded suitable plastic or PVC material. Extending generally parallel with array 112 and spaced slightly from it are ridges 118a and 118b formed on a broad base 118c. These ridges serve two primary purposes. First, they act as contact surfaces for contacting a vehicle, taking the wear against the vehicle surface and protecting openings 110 from being grabbed or engaged by damaging protrusions. This prevents the distributor fabric from being worn or torn at the openings. Second, the ridges, also referred to as barrier means, form an enclosed region 124 when the first set of openings are close to a vehicle surface. With the air being forced out of the openings, this tends to lift the nozzle away from the vehicle surface, thereby reducing the force of contact of the nozzle on the vehicle.

Figure 9:
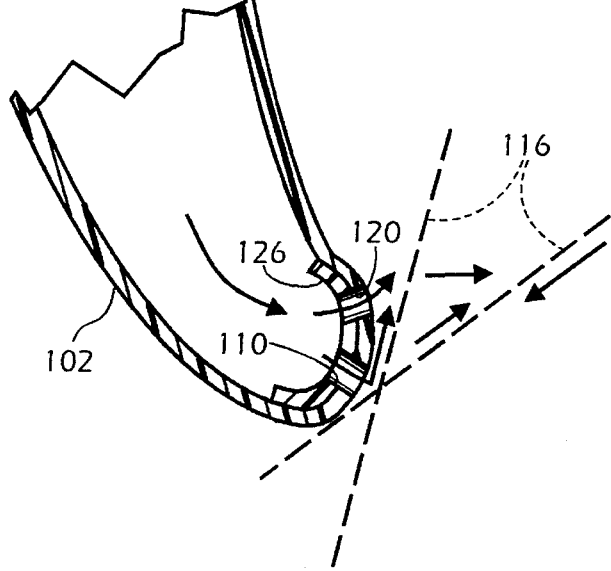
FIG. 9 is a view similar to FIG. 8 showing an alternative embodiment of the outlet structure of the nozzle of FIG. 5.

In the embodiment of FIG. 9, a patch 126 of webbing, preferably made of a material similar to that of the air distributor, is laminated onto the inside surface of the distributor, as shown. Although this embodiment does not have the opening-protecting ridges, it does provide a smooth, uninterrupted and reinforced surface for the vehicle surface to pass along.

Air distributor 102 could be made of a lightweight rigid material, such as a metal. Such materials, however are generally heavier than a fabric, and are more abrasive to a vehicle surface when they come in contact with it. Fabrics have been found to be lightweight until they absorb water, such as from an associated car wash. This increases the pressure of the nozzle on the vehicle surface. In order to properly control the position of opening array 108 relative to a variety of vehicle surfaces, it is important that the air distributor be substantially rigid during use. This is particularly feasible when the nozzle is used with a separate hinge, such as hinge 46, in a nozzle assembly, such as assembly 42 or 44.

Figure 7:
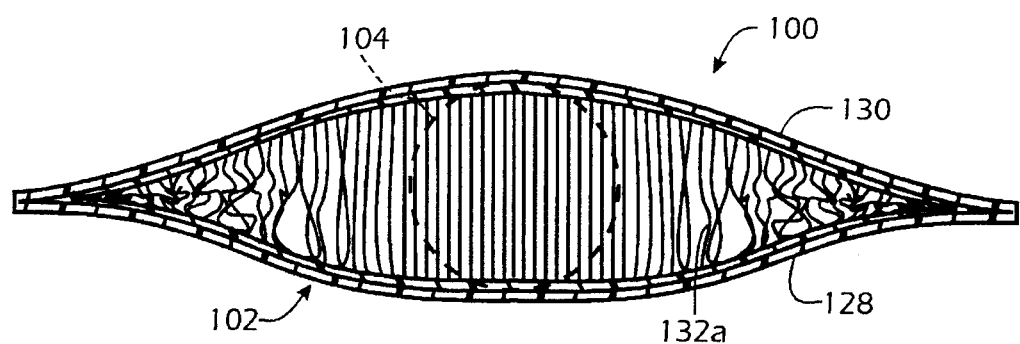
FIG. 7 is a cross-section taken along line 7—7 in FIG. 5.
Figure 8:
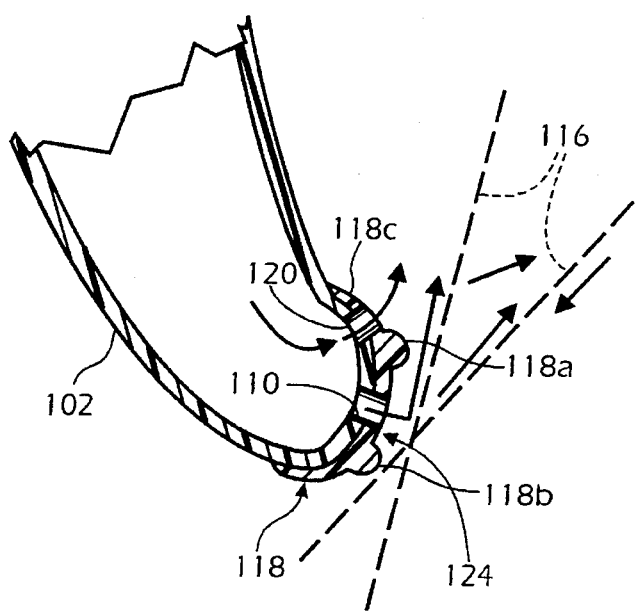
FIG. 8 is a cross-section taken along line 8—8 in FIG. 5.

It has been found that the features of lightweightedness, rigidity, and waterproofness are found in a structure particularly shown in FIG. 7 in which an outer layer or skin 128 is made of a commonly available waterproof flexible fabric such as a eurethane-coated mylon fabric such as Coolthane sold by Cooley Company of Pawtuckett, R.I., which is commonly used to construct inflatable objects, such as rafts. Other similar fabrics, such as those known as PVC or Hypalon could also be used. In between the skins of fabric is a drop-stitch inflatable fabric 130 made of nylon, such as is provided by U.S. Plush Mills, Inc., of Pawtucket, R.I. The drop-stitch fabric is hot glued to the inside of skin 128 and gathered slightly on the inside of a contour, such as for producing the curve shape shown in FIG. 6. The drop-stitch fabric has threads 130a connecting opposite layers, as shown in FIG. 7, which limit the expansion of the air distributor. A six-inch (15.24 cm) width fabric is preferable for use in nozzle 100. The side edges of the skins are hot glued or vulcanized to form air tight seams. The end face with the openings is a seamless folded portion of the skin.

The curve or arc in the nozzle directed toward the oncoming vehicle surface resists bending of the air distributor backwards when inflated. The inherent rigidity of the air distributor, when inflated during use, also inhibits deformation, thereby transferring any forces from a contacted vehicle to the hinge which is relatively freely rotatable.

Figure 10:
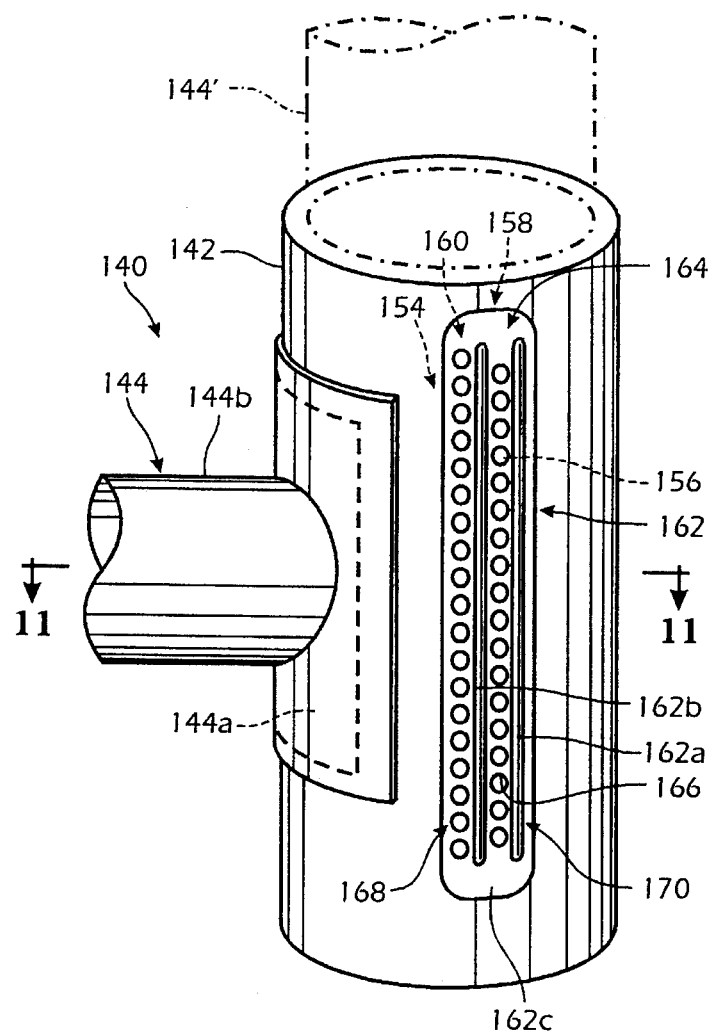
FIG. 10 is an isometric view of a second preferred embodiment of a nozzle usable in the hinged nozzle assemblies of FIG. 1.
Figure 11:
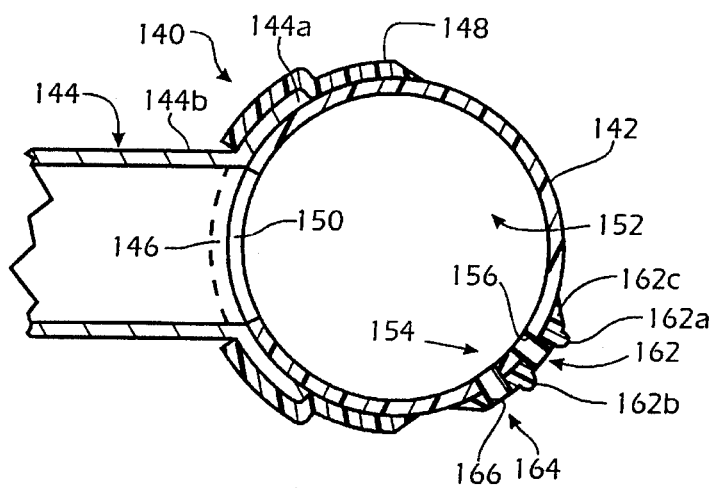
FIG. 11 is a cross-sectional view of the nozzle of FIG. 10.

FIGS. 10 and 11 illustrate a nozzle 140 that is an alternative embodiment of nozzle 48 for use in a hinged nozzle assembly 42. Nozzle 140 includes a generally cylindrical air distributor cell 142. Cell 142 is preferably also made of a suitable material, such as the commercially available material known by the proprietary name Coolthane, as was described for cell 102 of nozzle 100. The seams are formed by well known techniques, such as radio-frequency welding (RFW), also referred to as vulcanizing using RFW machines such as ones available from Kabor Co. of Long Island, N.Y. They may also be glued, hot air welded, or stitched together using conventional sewing machines.

An inlet air duct 144 is connected to a hinge outlet duct 94 by conventional means, such as suitable bolted flanges and gaskets, or is an extension of duct 94. Duct 144 has a cell-conforming mounting flange 144a attached to a cell-end 144b which has an outlet 146, as shown. Duct 144 and flange 144a are made of any suitable lightweight rigid material, such as aluminum or PVC. The flange conforms to and is secured on the surface of cell 142, depending on what it is made of, by gluing or radio-frequency welding. It is preferable that it be further secured by a cover 148 extending beyond the periphery of the flange. The edges of the cover are secured to the cell and the cover may also be glued to the flange. Air distributor cell 142 has an inlet 150 conforming with duct outlet 146. The cell thus defines an open air distribution chamber 152 of substantially equal pressure.

An inlet duct may be connected to cell 142 anywhere along its length, or even on an end, as shown by duct 144' in phantom lines.

Extending longitudinally along a portion of the side of cell 142 is an array 154 of alternating outlets or openings 156, which openings form two parallel rows 158 and 160. Array 154 is similar to array 108 described with reference to nozzle 100, and can have other numbers and arrangements of openings.

A nozzle guard 162 made the same as guard 118 described with reference to nozzle 100 covers array 154 and has a corresponding array 164 of openings 166 formed as two rows 168 and 170. Two ridges 162a and 162b extend the length of and are parallel with rows 168 and 170. Row 170 is between the two ridges, as shown. Guard 162 is positioned on cell 142 to function as described for guard 118.

When inflated during use, cell 142 is resilient, allowing some deformation as guard 162 moves along a vehicle surface. This enhances the accommodation of the associated hinge in minimizing the force of the guard on the vehicle surface. This is a particular advantage of nozzle 140 over nozzle 100 which is more rigid.

The air blower system provided by the invention can thus be seen to provide improved blowing of vehicle surfaces at close range, while protecting the nozzle and vehicle. A freely rotatable hinge minimizes contact force with the vehicle. A generally even-length distribution system applies relatively even air flow to each nozzle. The compact, enclosed air producers are less noisy and obtrusive.

It will be apparent to one skilled in the art that variations in form and detail may be made in the various aspects of the specific design described without varying from the spirit and scope of the invention as defined in the claims. The preferred embodiment is thus provided for purposes of explanation and illustration, but not limitation.

I claim:

1. In a car wash air distribution system having an air distribution duct, a nozzle for directing a stream of air toward the surface of a vehicle positioned adjacent to said nozzle comprising;

a cell defining an air distribution chamber with an inlet for receiving air under pressure from the air distribution duct and a first linear array of outlet openings, each opening being substantially smaller than said cell inlet, said cell being formed of flexible webbing extending in an arc between said inlet and said array of outlet openings; and barrier means extending outwardly from said cell adjacent to and along at least one side of said array of openings for barring the flow of air from said openings past said barrier means when placed adjacent to the surface of a vehicle.

2. In a car wash air distribution system having an air distribution duct, a nozzle for directing a stream of air toward the surface of a vehicle positioned adjacent to said nozzle comprising;

an elongate cell having a continuously curved circumferential surface and defining an air distribution chamber with an inlet for receiving air under pressure from the air distribution duct and a first linear array of outlet openings extending longitudinally along said cell surface, each opening being substantially smaller than said cell inlet; and barrier means extending outwardly from said cell adjacent to and along at least one side of said array of openings for barring the flow of air from said openings past said barrier means when placed adjacent to the surface of a vehicle.

3. A nozzle according to claim 2 wherein said barrier means comprises a continuous ridge extending outwardly from said cell surface.

4. A nozzle according to claim 3 further comprising one of said ridges on each side of said array.

5. A nozzle according to claim 4 further comprising a second linear array of openings extending along one of said ridges opposite from said first array.

6. In a car wash air distribution system having an air distribution duct, a nozzle for directing a stream of air toward the surface of a vehicle positioned adjacent to said nozzle comprising;

a cylindrical cell defining an air distribution chamber with an inlet for receiving air under pressure from the air distribution duct and a first rectilinear array of outlet openings, each opening being substantially smaller than said cell inlet; and barrier means extending outwardly from said cell adjacent to and along at least one side of said array of openings for barring the flow of air from said openings past said barrier means when placed adjacent to the surface of a vehicle.

7. A nozzle connectable to a pressurized air source of a car wash air distribution system for directing a stream of air toward the surface of a vehicle positioned adjacent to said nozzle, said nozzle comprising:

a cylindrical cell defining an air distribution chamber with an inlet for receiving air under pressure from the air distribution system and first and second adjacent and parallel linear arrays of outlet openings, each opening being substantially smaller than said cell inlet; and a guard mounted on said cell over said arrays of openings, said guard including an elongate base portion having openings in alignment with said cell openings, a first ridge portion extending outwardly from said base portion between and along said first and second arrays of openings, and a second ridge portion extending outwardly from said base portion and along one of said first and second arrays of openings opposite from said first ridge portion, said first and second ridge portions forming barriers to the flow of air from said one array of openings for urging said nozzle away from a vehicle surface when said guard is placed adjacent to a vehicle surface during use.

8. A nozzle according to claim 7 wherein said openings in said first and second arrays of openings alternate longitudinally along said cell.

* * * * *